May 17, 1960  W. H. NEELY  2,936,823
SEATING CONSTRUCTION
Filed Dec. 16, 1957  9 Sheets-Sheet 1

Inventor
WILLIAM H. NEELY
By Gustav A. Wolff
Attorney

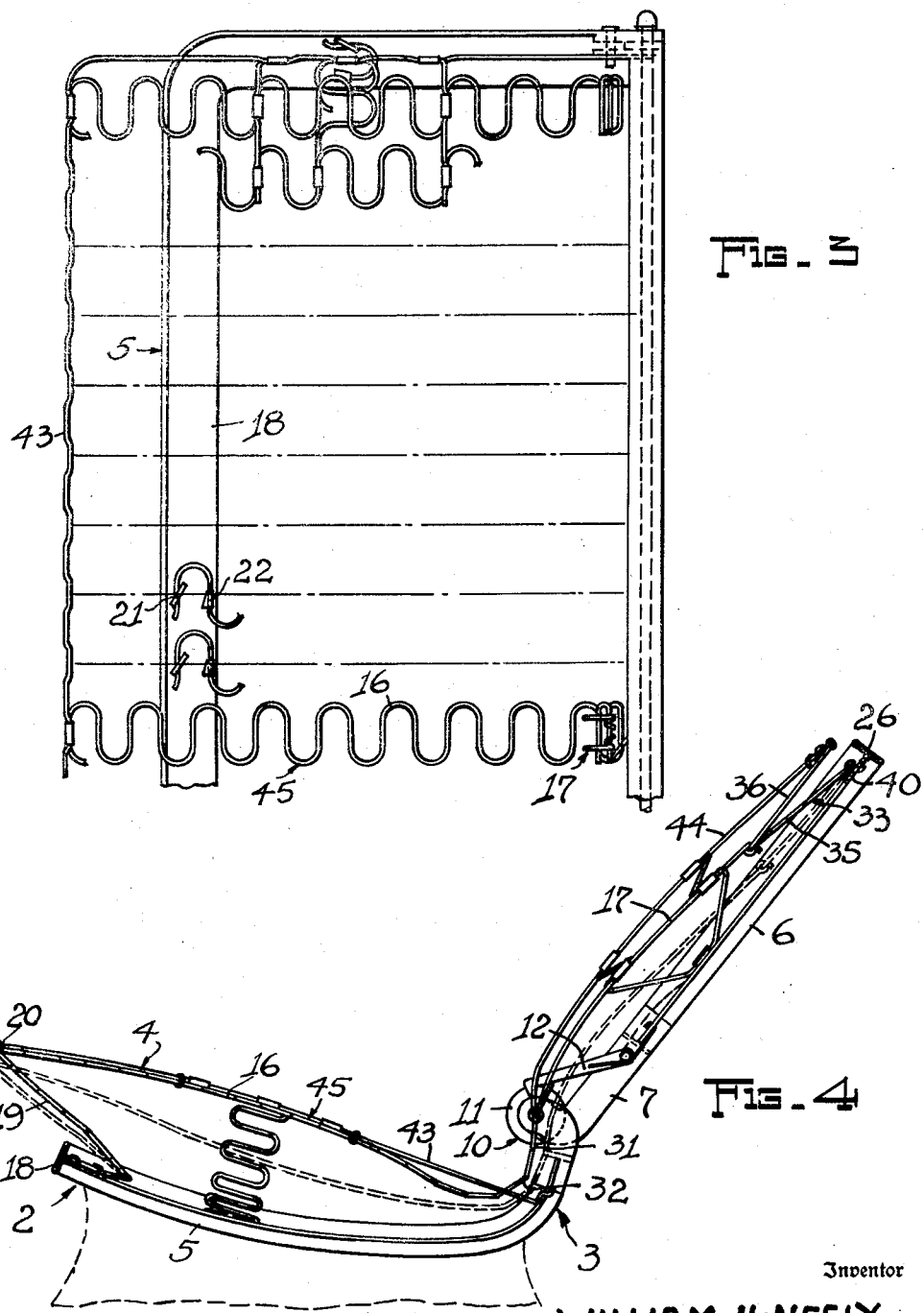

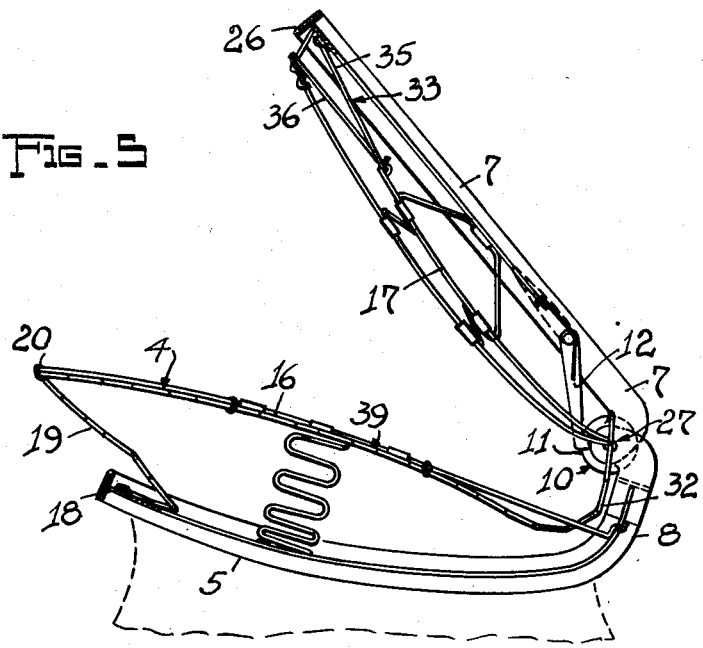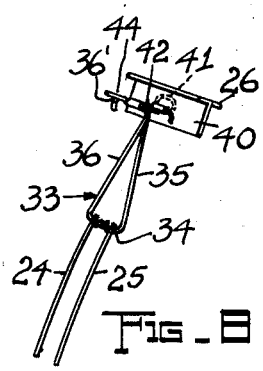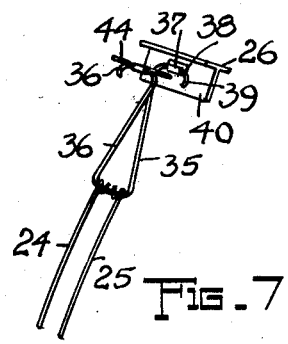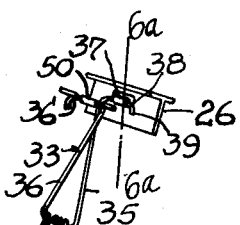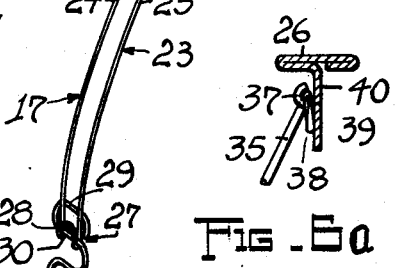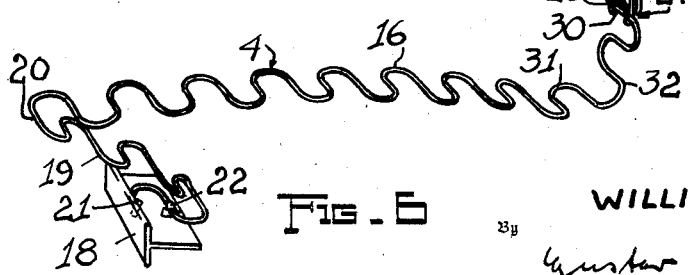

May 17, 1960 W. H. NEELY 2,936,823
SEATING CONSTRUCTION
Filed Dec. 16, 1957 9 Sheets-Sheet 4
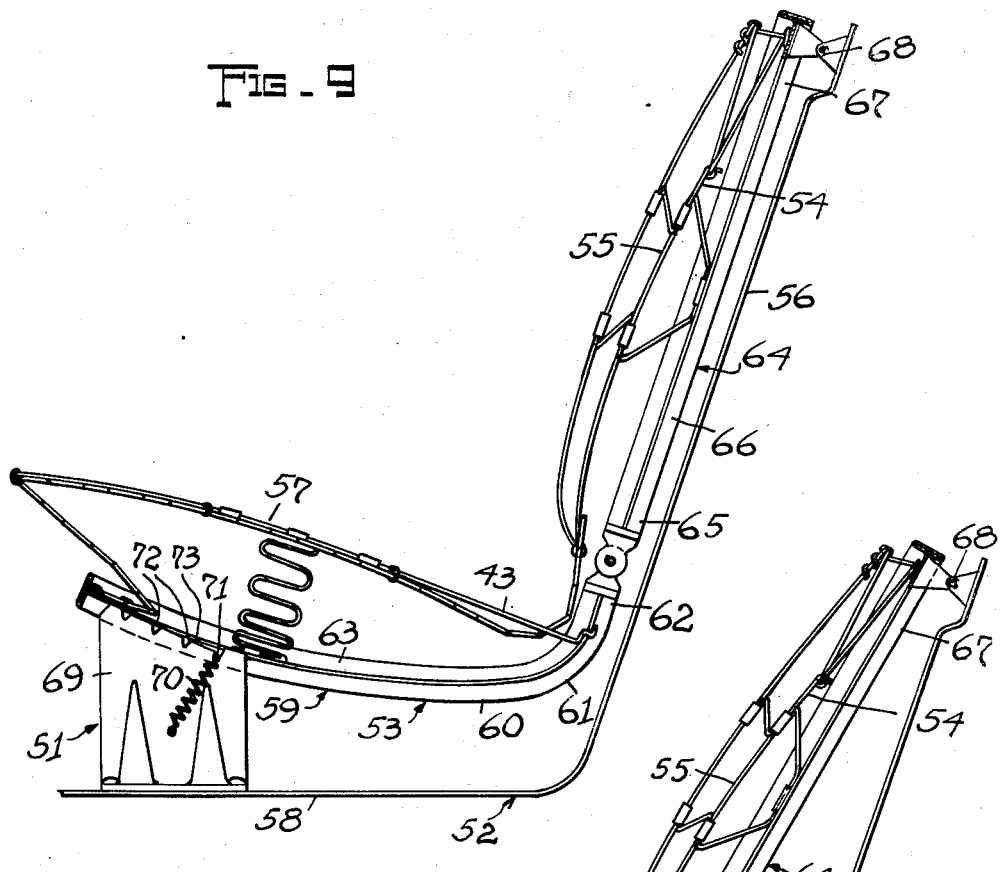
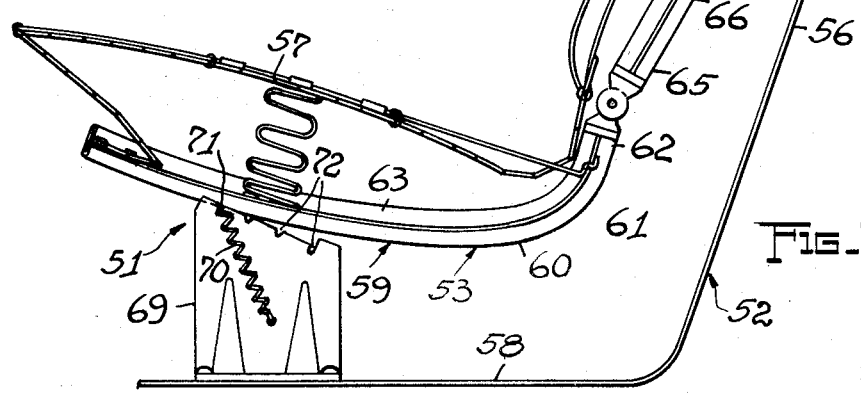
Inventor
WILLIAM H. NEELY
By
Attorney May 17, 1960 W. H. NEELY 2,936,823
SEATING CONSTRUCTION
Filed Dec. 16, 1957 9 Sheets-Sheet 5
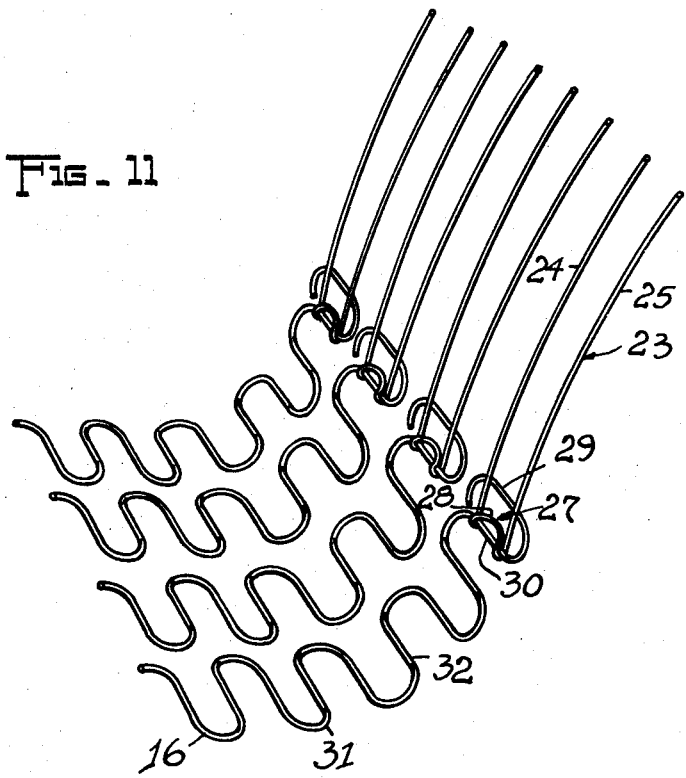
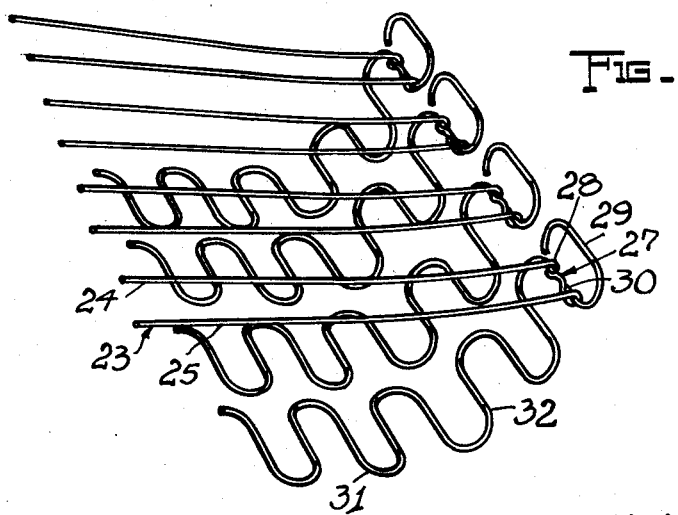
Inventor
WILLIAM H. NEELY
By [signature]
Attorney May 17, 1960 W. H. NEELY 2,936,823
SEATING CONSTRUCTION
Filed Dec. 16, 1957 9 Sheets-Sheet 6
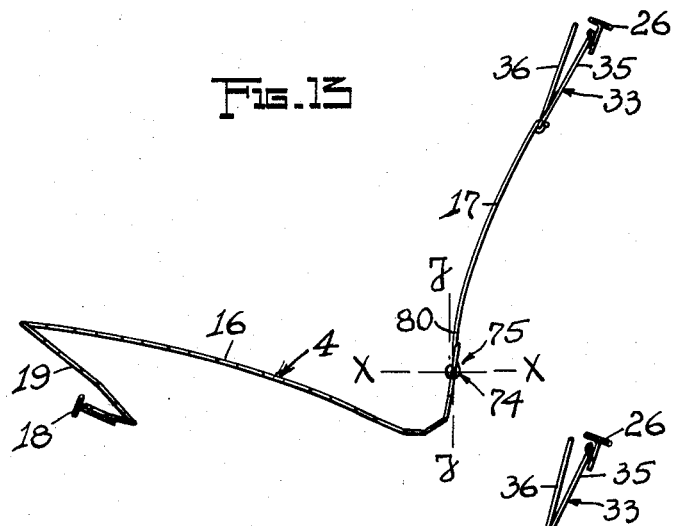
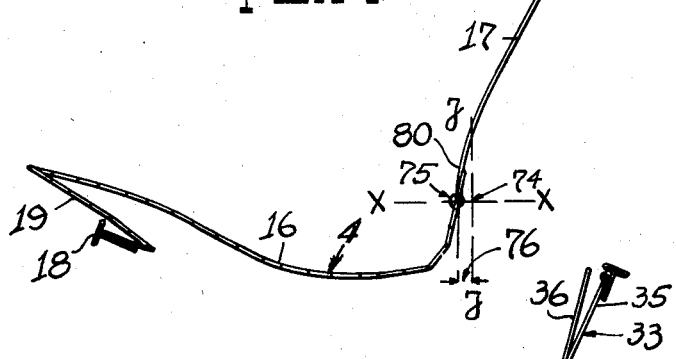
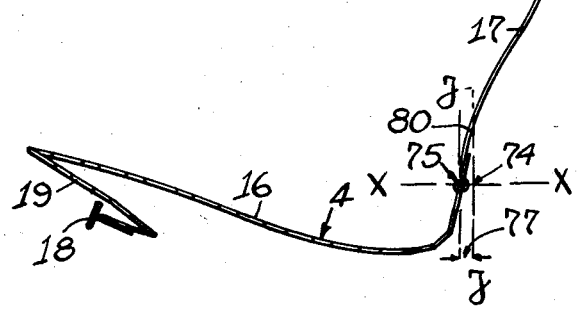
Inventor
WILLIAM H. NEELY
By
Attorney

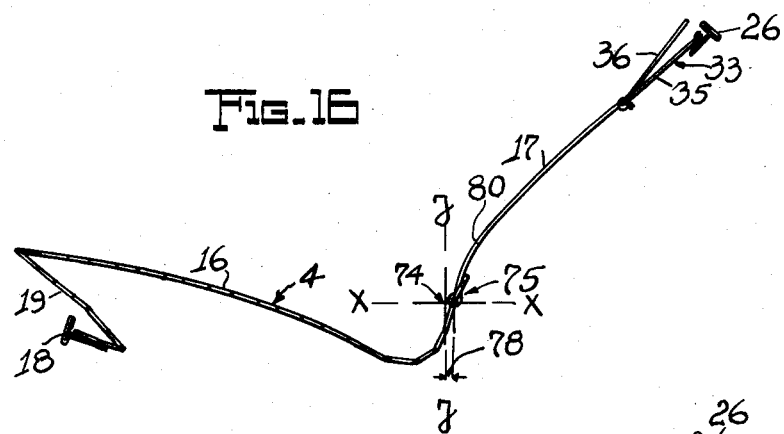
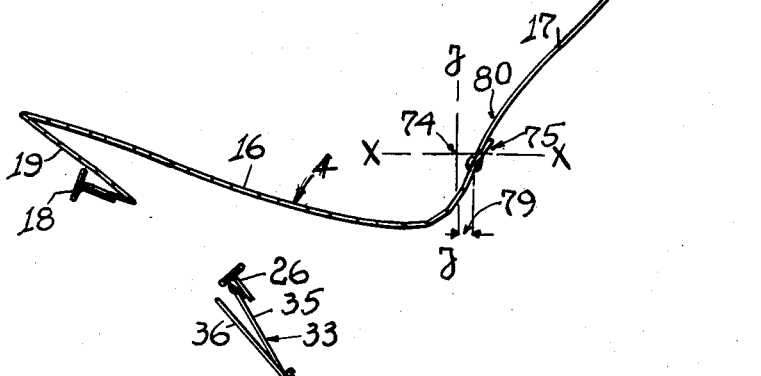
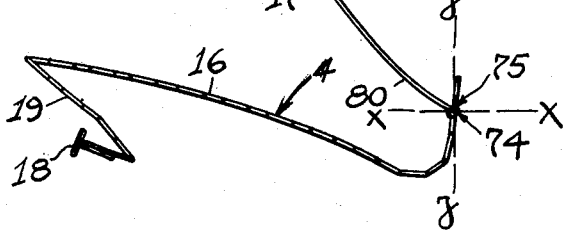

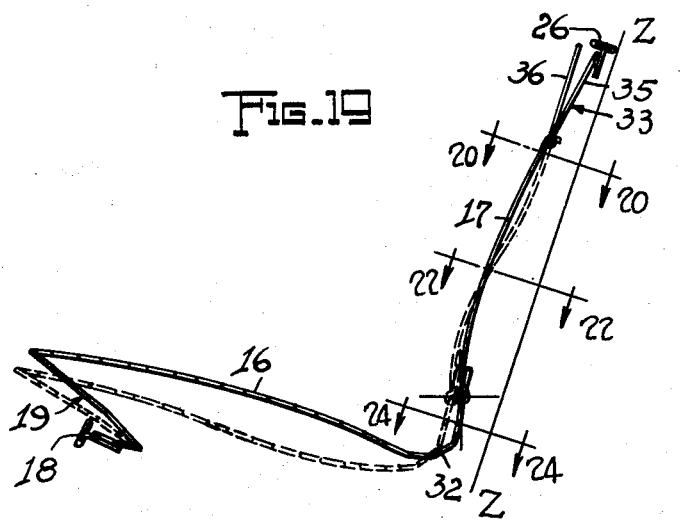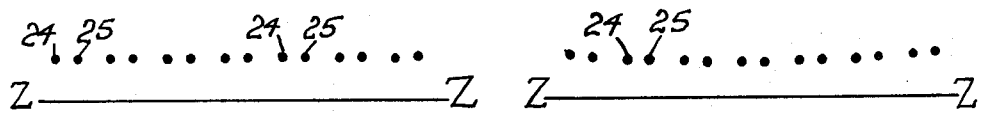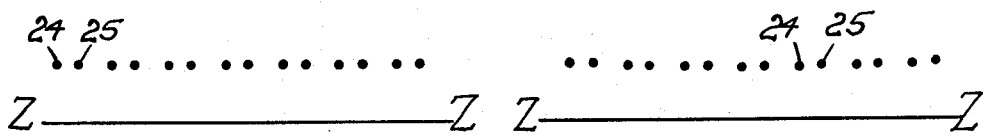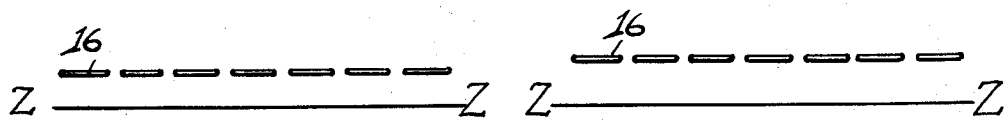

May 17, 1960 W. H. NEELY 2,936,823
SEATING CONSTRUCTION
Filed Dec. 16, 1957 9 Sheets-Sheet 9

Inventor
WILLIAM H. NEELY
By
Attorney

United States Patent Office 2,936,823
Patented May 17, 1960

2,936,823

SEATING CONSTRUCTION

William H. Neely, Cleveland, Ohio, assignor to Universal Incorporated

Application December 16, 1957, Serial No. 703,067

5 Claims. (Cl. 155—179)

The present invention relates generally to wire spring elements for upholstered seating constructions.

The earliest form of cushioned seat construction to receive widespread acceptance for use in the automotive industry consisted essentially of nested coil spring elements. With minor variations and detailed improvements, this type of structure was unchallenged in use for automotive seating applications for more than thirty years. The need for more simplified forms of seat structures became increasingly important to the automotive industry, and was substantially met by the adoption of zig-zag spring units and knock-down assemblies of the type typically disclosed in my Patent 2,280,480. Further developments and refinements of the basic zig-zag spring unit concept in recent years have provided acceptable seating comfort at low cost, while satisfying the demands for ruggedness and reliability in automotive applications, and have enabled the automotive industry to effectively and practically undertake seating assembly directly in their various assembly plants throughout the country.

Styling appearance has now become a factor of ruling importance in the automotive industry. As automobiles have been re-styled lower and lower, and as engineers have developed more mechanical variations affecting frame and body shape, the seating problem has become increasingly difficult. As the roofs of cars are lowered, as the transmissions are moved adjacent the rear axles, and as new air chassis suspensions and other mechanical innovations are adopted by the automotive industry for advanced performance purposes, less space is available for seating the passengers with adequate comfort through the mere use of prior known seat structures.

The lowering of car roofs by automotive stylists, and the increasing use by vehicle engineers of sharply angled ramps, large tunnels, and other irregular configurations extending upwardly into the floor pans to accommodate novel transmissions, suspensions and the like, has resulted in extreme reductions in the available inside space for static seating with little or no "extra" space for absorbing shock loading.

In order to achieve comfortable static seating within an automobile there should be sufficient inside space available to permit the spring surfaces and the supporting padding and upholstery to deflect for load support. There must be a minimum necessary spring deflection space for adequate total cushion and back penetration, under seating load pressures low enough to maintain reasonable body comfort, and at the same time there must also be still further free deflection space available to absorb shock load penetrations. It should be recognized, therefore, that any new concept in automobile seating must provide adequate seating comfort under both static and shock load conditions with relatively thin cushion and back structures; must provide rear seat foot room despite floor pan conformation and obstructions; and must achieve full shock load absorption and continuous dampening within a minimum available space.

It is the primary purpose of this invention to provide an entirely novel combination of wire spring elements for seating constructions, and particularly for the application of such constructions to automotive seating, wherein a high degree of seating comfort is achieved with a minimum of body penetration while effecting full body-supporting contact and wide distribution of loading forces. The structure and principles of the present invention permit the achievement of an entirely novel "suspended seating" function, wherein the application of body load forces to the seating construction effects independent stretch-loading of each spring element, resulting collectively in a cooperating interaction of the various cushion and back portions of the spring elements for dynamically balanced movement and yielding of the seating surfaces defined thereby. In this way, supporting contact with the body load in full conformity with the normal body load shapes is achieved, thereby providing a maximum of contacting support with full comfort and efficient shock load absorption and dampening.

The general object of the invention is the provision of a wire spring construction embodying a plurality of generally L-shaped wire springs arranged side-by-side with each wire spring including a longitudinally non-extensible back resting portion suspended at one end by link means from a frame means and a longitudinally extensible yielding seat portion having its one end mounted in elevated, forwardly extended position on the frame means and its opposite free end connected to and suspended from the free end of the longitudinally non-extensible back resting portion of the wire spring unit.

Another object of the invention is the provision of a wire spring construction of the type referred to above, in which each wire spring has the front end of its longitudinally extensible seating portion supported in cantilever-like fashion on the frame in elevated position with respect thereto.

A further object of the invention is the provision of a wire spring construction of the type referred to, in which each wire spring includes in the extensible seat portion near the rear end thereof a rearwardly and upwardly extended sweep having its upper end merging into the lower portion of the longitudinally non-extensible back rest portion of the wire spring.

Still another object of the invention is the provision of a wire spring construction of the type referred to above, in which each wire spring includes individual, partly-overlapping seat and back rest portions connected to each other in cantilever-like fashion.

A still further object of the invention is the provision of a wire spring construction of the type referred to, in which each wire spring has its longitudinally non-extensible back rest portion arranged to overlap the rearwardly and upwardly extended sweep of the longitudinally extensible seat portion, and in which the overlapped portions of the back rest and seat are coupled to each other to provide a cantilever-like connection between the overlapping portions when the back rest portion is tilted in a rearward direction and a pivot-like connection when the back rest portion is tilted in a forward direction.

Still another object of the invention is the provision of a wire spring construction of the type referred to, in which the cross section of the wire forming the back rest portion differentiates in area from the cross section of the wire forming the seat portion of the wire springs, thereby to predetermine the relative flexibility of the back rest and seat portions for dynamically balanced movement and yielding of the seating surfaces.

A still further object of the invention is the provision of a wire spring construction of the type referred to, in which the cross section of the wire forming the longitudinally non-extensible back rest portions of the wire springs is smaller in area than the area of the cross section of the wire forming the longitudinally extensible seat portions of the wire springs to permit, under load, shaping of predetermined areas of the back rest portions for proper seating and control of stresses caused by loads and shock loads.

Still another object of the invention is the provision of a wire spring construction of the type referred to, in which the front portion of the seat portion includes yielding supporting means attached in cantilever-like fashion to the frame means of the wire spring construction in inclined position with respect thereto to avoid rearward movement of the seat portion when loaded and attain desired fore and aft stability of the wire spring construction.

Still a further object of the invention is the provision of a wire spring construction comprising a plurality of independently movable wire spring elements of the type referred to, which in unloaded condition collectively form a foundation adapted to support upholstery material for a predetermined trim contour, and in loaded condition collectively effect hugging contact with the load through the upholstery material, thus decreasing localized pressures and attaining a high degree of seating and resting comfort with a minimum of upholstery material.

With the above and other objects in view, the invention has certain other marked superiorities which clearly distinguish it from presently known structures and arrangements of this type. These improvements or characteristics embodying certain novel features of construction and design are clearly set forth in the appended claims and the preferred forms of embodiment of the invention hereinafter shown with reference to the accompanying drawings forming part of the specification.

In the drawings:

Fig. 3 is a fragmentary plan view of the wire spring construction shown in Fig. 1 taken from line 3—3 of Fig. 1.

Fig. 4 is a transversal sectional view similar to Fig. 1, showing the wire spring construction in reclined position, indicating the spring elements unloaded in solid lines and loaded in dotted lines.

Fig. 5 is a transversal sectional view similar to Fig. 1, showing the wire spring construction in folded position.

Fig. 6 is a perspective view of one of the wire spring units of the wire spring construction.

Fig. 6a is a fragmentary cross-sectional view taken on line 6a—6a of Fig. 6.

Fig. 7 is a fragmentary perspective view of a modified form of the suspended upper end of the back resting portion of a wire spring unit.

Fig. 8 is a fragmentary perspective view of another modified form of the suspended upper end of the back resting portion of a wire spring unit.

Fig. 9 is a transversal sectional view through a non-foldable wire spring construction.

Fig. 10 is a transversal sectional view similar to Fig. 9, showing the wire spring construction in reclined position.

Fig. 11 is a fragmentary perspective view of a plurality of wire spring units in opened up position.

Fig. 12 is a view similar to Fig. 11, with the wire spring units shown in folded position.

Figs. 13 through 17 are diagrammatic views of a wire spring unit mounted on a frame, showing different shapes of the wire spring unit in normal position when unloaded, when seat-loaded and when fully loaded, in inclined position when unloaded and when fully loaded, and in folded position; thus Fig. 13 is a diagram of a mounted wire spring unit in normal position and unloaded.

Fig. 14 is a diagram of the wire spring unit when seat-loaded.

Fig. 15 is a diagram of the wire spring unit when fully loaded.

Fig. 16 is a diagram of the wire spring unit in reclined position when unloaded.

Fig. 17 is a diagram of the wire spring unit in reclined position when fully loaded; and Fig. 18 is a diagram of the wire spring unit when in folded position.

Figs. 19 through 32 are diagrammatic views of a wire spring construction showing in diagrammatic cross sections shapes of the back resting portion of the wire spring construction in normal and reclined positions, unloaded and fully loaded conditions; thus Fig. 19 is a diagrammatic cross-sectional view of the wire spring construction in normal seating position, showing the spring elements unloaded in solid lines and loaded in dotted lines.

Fig. 20 is a sectional view taken on line 20—20 of Fig. 19, the wire spring construction being unloaded; and Fig. 21 is a sectional view similar to Fig. 20, the wire spring construction being fully loaded.

Fig. 22 is a sectional view similar to Fig. 20 taken on line 22—22 of Fig. 19.

Fig. 23 is a sectional view similar to Fig. 22, the wire spring construction being fully loaded.

Fig. 24 is a sectional view on line 24—24 of Fig. 19, the wire spring construction being unloaded; and Fig. 25 is a sectional view similar to Fig. 24, the wire spring construction being fully loaded.

Figure 1:
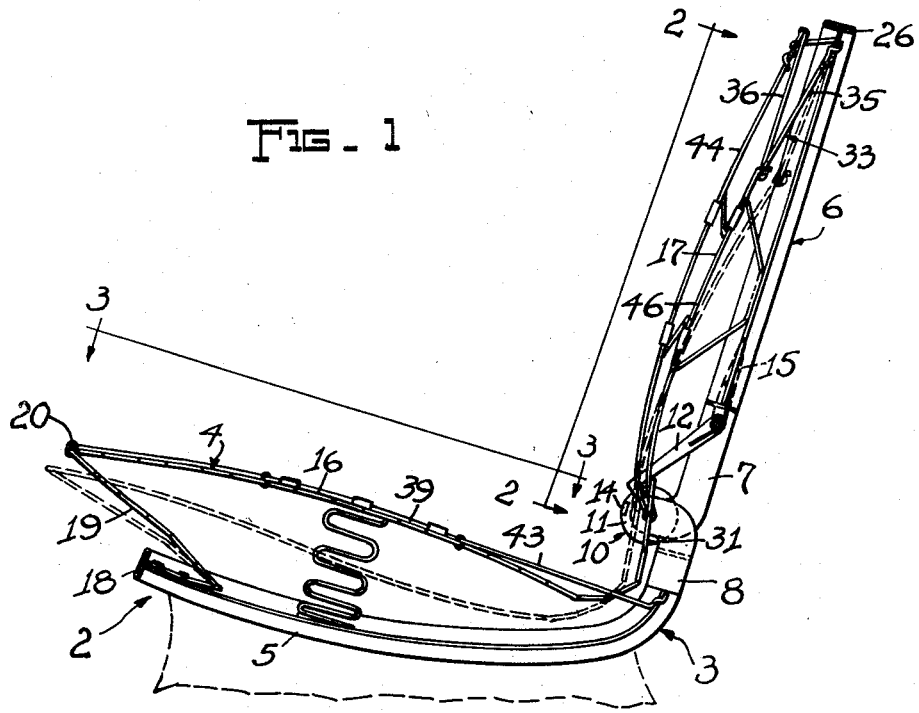
Fig. 1 is a transversal sectional view through a foldable wire spring construction according to the invention, indicating the spring elements unloaded in solid lines and loaded in dotted lines.
Figure 2:
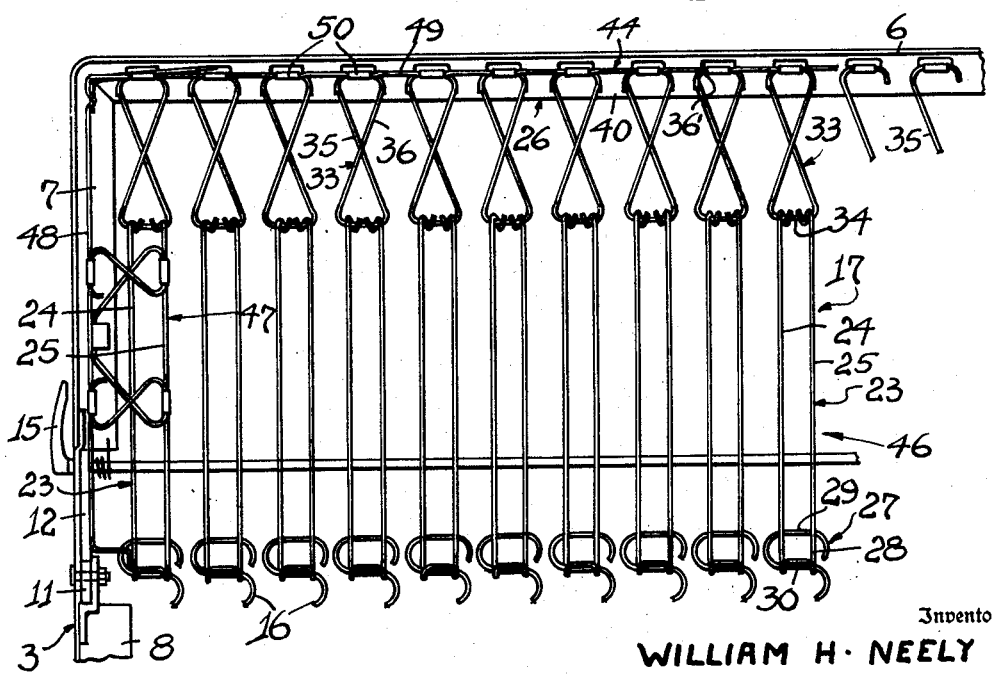
Fig. 2 is a fragmentary front view of the wire spring construction shown in Fig. 1 taken from line 2—2 of Fig. 1.
Figure 26:
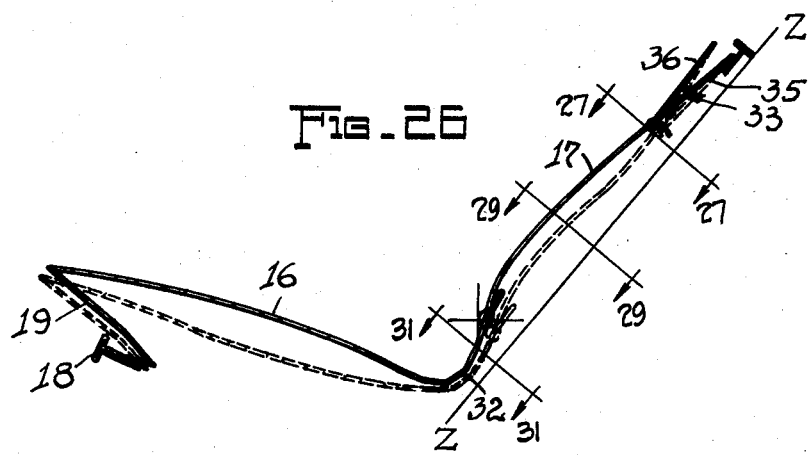

Fig. 26 is a diagrammatic cross-sectional view of the wire spring construction in reclined position showing the spring elements unloaded in solid lines and loaded in dotted lines.

Figures 27, 28:
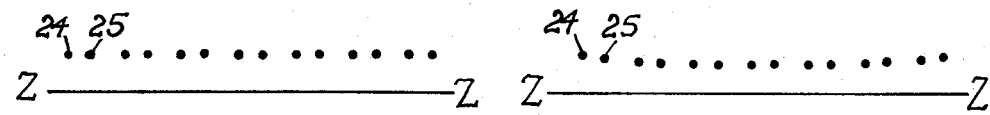

Fig. 27 is a sectional view taken on line 27—27 of Fig. 26, the wire spring construction being unloaded.

Fig. 28 is a sectional view similar to Fig. 27, the wire spring construction being fully loaded.

Figures 29, 30:
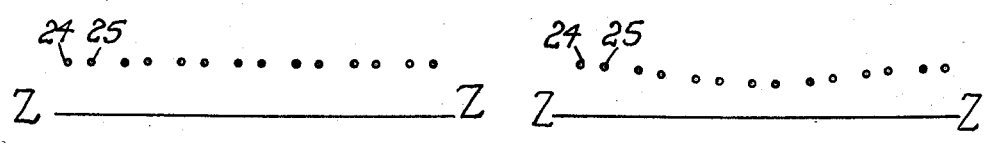

Fig. 29 is a sectional view similar to Fig. 26, taken on line 29—29 of Fig. 26.

Fig. 30 is a sectional view similar to Fig. 29, the wire spring construction being fully loaded.

Figures 31, 32:
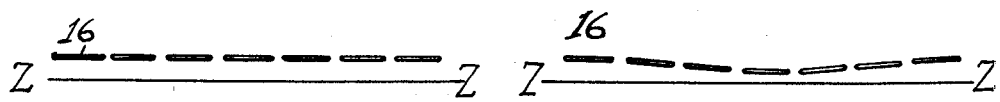

Fig. 31 is a sectional view on line 31—31 of Fig. 26, the wire spring construction being unloaded.

Fig. 32 is a sectional view similar to Fig. 31, the wire spring construction being fully loaded.

Referring more particularly to the seat spring constructions shown in the drawings, reference numeral 2 denotes a front seat spring construction embodying an open frame or supporting means 3 mounting a plurality of wire spring units 4. Frame 3 includes two generally U-shaped rails: a stationary lower U-shaped rail 5 and an upper U-shaped rail 6 which is hinged with its side arms 7 to the side arms 8 of lower rail 5 to permit angular tilting of upper rail 6 with respect to lower rail 5. The position of upper rail 6 with respect to lower rail 5 is selectively controlled by a locking device 10 which embodies a notched cam member 11 rigidly attached to lower U-shaped rail 5 and a spring-pressed pawl 12 pivoted to upper U-shaped rail 6, which pawl cooperates with notches 14 in cam member 11 in locking upper rail 6 in predetermined positions to lower rail 5. Locking device 10 is readily released by disengaging the pawl 12 from notches 14 of cam member 11 and such disengagement is effected by a handle 15 coupled with pawl 12.

Frame 3 mounts wire spring units 4 in substantially parallel relation crosswise thereof, each wire spring unit embodying a longitudinally extensible, zig-zag shaped wire seating portion 16 and a longitudinally non-extensible, straight wire back resting portion 17 cooperating with seating portion 16. Although the back resting portions 17 are shown in the drawing as being forwardly curved, such curvature merely provides rearward yieldability in response to the load forces of an occupant's body and does not provide any significant end-to-end elongation of the portions 17 when the entire seat structure is loaded. The back resting portions 17, therefore, are properly designated as being longitudinally non-extensible, and particularly so when considered in relation to the substantial extensibility of the zig-zag seating portions 16 from end-to-end when loaded. Each longitudinally extensible seating portion 16 is mounted on web 18 of lower U-shaped rail 5 by a yieldable lever arm 19 rearwardly and downwardly extended from front end 20 of such seating portion, and this lever arm is attached to web 18 by flat loop 21 projected from said web and hook-shaped portion 22 struck up from web 18 to effect a substantially cantilever-like connection with web 18. The fixed connection of the lower and rearward end of the lever arm 19 to the rail 5 and the yieldability of the lever arm 19 in response to seating loads enables an arcuate movement of the seating portion front end 20 to various positions of balanced response to the normal or static seating load and to shock loads, whereby an effective fore and aft stability is achieved for the wire spring unit 4. The longitudinally non-extensible, straight wire back resting portion 17 includes a straight, generally U-shaped wire body 23, the elongated arms 24, 25 of which are linked to web 26 of upper U-shaped rail 6 of frame 3 for suspending back resting portion 17 from frame 3 in a manner later to be described.

Longitudinally extensible seating portion 16 and longitudinally non-extensible back resting portion 17 of each wire spring unit are coupled with each other in cantilever-wire fashion by hook-shaped configuration 27 at U-shaped end portion 28 of straight wire body 23. This hook-shaped configuration 27 is extended through seating portion 16 between adjacent wire cross members 29, 30 near the end of the seating portion and pivotally connected to wire cross member 30 to suspend rear portion 31 of seating portion 16 from back resting portion 17 and effect cantilever-like connection of the back resting portion 17 with the seating portion 16 when the back resting portion is forced rearwardly and a pivotal connection of the back resting portion 17 with the seating portion 16 when the back resting portion is tilted in a forward direction. This dual functional action of the cantilever-like coupling is best seen in comparative Figures 11 and 12.

Alignment of seating portion 16 with back resting portion 17 is effected by providing rear portion 31 of seating portion 16 with a rearwardly and upwardly extended sweep 32 of substantial arcuate length, merging or blending with the back resting portion 17, and contributing to proper reclining of back resting portion 17 and proper support of an occupant. The sweep 32 enables bending or opening movement of the wire springs at the zone of interconnection between the back resting portion 17 and the seating portion 16 to be distributed over a substantial length of arc, thereby contributing to a stretch movement of the seating structure toward effective hugging support of the body load in full conformity with the body load shape. The localized bending characteristic of any sharp or angular spring form at this bending zone would prevent the achievement of such "stretch-hugging" of the body load shape. The proper reaction or response of the seating and back resting portions is facilitated and may be predetermined by differentiating the flexibility of wires forming portions 16 and 17. In practice, the wire of the back resting portion is made substantially more flexible or bendable, as distinguished from extensible, than that of the seating portion by being of smaller diameter or cross-section.

Suspension of back resting portion 17 from web 26 of upper U-shaped rail 6 of frame 3 is effected by a generally V-shaped link 33 including a short wire cross member 34 and two elongated, angularly related, straight wire arms 35, 36 extended from opposite ends of wire cross member 34. V-shaped link 33 is hinged to the elongated arms 24, 25 of U-shaped body 23 of the longitudinally non-extensible, straight wire back resting portion 17 by wrapping arms 24, 25 around short wire cross member 34 and is connected to a tongue-like struck-up portion 37 of web 26 of upper U-shaped rail 6 by a cross member 38 at the end of elongated arm 24, which cross member 38 includes a lateral extension 39 angularly related to the axis of elongated arm 24 and yieldingly forcing the arm in a direction away from central flange 40 of T-shaped web 26 (see Figs. 6 and 6a). Pretensioned connection of arm 35 of link 33 with web 26 may be changed to a pivotal connection by arranging lateral extension 39 in the plane of link arm 35 and its cross member 38, as shown in Fig. 7, or may be a cantilever-like connection, see Fig. 8, showing arm 35 formed with a rearwardly offset loop 41 extended through a slot 42 in flange 40 of web 26.

Wire spring units 4 are connected to each other by U-shaped edge wire members 43, 44, U-shaped edge wire member 43 forming the border wire for seating area 45 of front seat spring construction 2 and U-shaped edge wire member 44 forming the border wire for the back resting area 46 of the front seat spring construction 2. U-shaped edge wire 44 is attached to the outer spring units 47 of back resting portion 17 by connecting the side arms 48 of the edge wire to arms 24, 25 of body 23 of outer spring units 47, and web portion 49 of U-shaped edge wire 44 is attached to arms 36 of links 33 by clips 50 securing web portion 49 to cross members 36' laterally extended from arms 36.

Wire spring units 4 are usable in reclinable and foldable automobile front seat constructions (see Figs. 1 to 5), but may readily be applied to automobile back seat spring constructions, chair seat spring constructions, etc. Such use is shown in Figs. 9 and 10 in which spring construction 51 includes an L-shaped frame 52 adjustably supporting an L-shaped seat spring structure 53 having the upper ends 54 of back resting portions 55 of wire spring units 4 linked to vertical branch 56 of frame 52. Seat spring structure 53 has its seating portion 57 shiftably mounted on horizontal branch 58 of frame 52 and includes an L-shaped frame 59 of two U-shaped frame portions: a generally horizontally extended U-shaped frame portion 60 including a rearwardly and upwardly extended sweep 61 in the end portions 62 of side flanges 63 and a generally vertically extended U-shaped back rest frame portion 64 pivoted with the end portions 65 of side flanges 66 to end portions 62 of side flanges 63. The upper end 67 of back rest frame portion 64 is hinged to the vertical branch 56 of frame 52 at 68 and seat frame portion 60 is shiftably mounted on brackets 69 on horizontal branch 58 and releasably held in adjusted position on these brackets by tension springs 70 connected to brackets 69 and side flanges 63 of seat frame portion 60 to secure same in the desired predetermined position when end portion 71 of tension springs 70 engage V-shaped slots 72 in rearwardly inclined upper edges 73 of brackets 69.

Spring construction 51 with wire spring units 4, mounted and interconnected as previously described, can be shifted into reclined position by shifting seat frame portion 60 from the position shown in Fig. 9 to the position shown in Fig. 10. This shifting of seat frame portion 60 tilts the back rest frame portion 64 with respect to seat frame portion 60 and such tilting may be partly controlled by the inclination of upper edges 73 of brackets 69 previously described as rearwardly inclined.

Seat spring constructions of the type described mount their generally L-shaped wire spring units on generally L-shaped frame structures by supporting the front portions of the longitudinally extensible seating portions in cantilever-like fashion upon the horizontal branch of the L-shaped frame and suspending the longitudinally non-extensible back resting portions by means of links from the vertical branch of the L-shaped frame. A cantilever-like mounting of the front ends of the longitudinally extensible seating portions provides same with yielding front edges and insures fore and aft or horizontal stability for the wire spring units, and linked suspension of the longitudinally non-extensible back resting portions, which are connected to the longitudinally extensible seating portions, effects suspension of the rear ends of the seating portions after slight downward movement until the links and the arms of the bodies of the back resting portions are substantially aligned, provides vertical stability for the wire spring units and insures a cooperative stretch-loading action of their "suspended" seating and back resting portions for huggingly supporting an occupant by contacting substantial areas of the body load shape, thus eliminating excessive localized stresses in the wire spring units under normal and shock loads.

Proper hugging support of body load shapes by the described wire spring seating construction is effected by the response of the construction to body load forces thereon. Independent stretch-loading of each spring element collectively effects a cooperating interaction of the seat back and sweep portions to provide substantially full supporting contact with the body load shape of an occupant, while avoiding excessive gripping of the occupant but insuring yielding contact of the lower part of the back resting portion with the hollow of the occupant's back.

Action of the seat spring constructions, unloaded or fully loaded, is best understood by reference to the diagrams of Figs. 13 through 32. These diagrams disclose in Fig. 13 a wire spring unit 4 including a reference pivot 74 axially aligned with the hook-shaped cantilever-like connection 75 of longitudinally extensible seating portion 16 and longitudinally non-extensible back resting portion 17, as indicated by intersected rectangularly related lines $x$—$x$ and $y$—$y$. Loading of the longitudinally extensible seating portion 16 of wire spring unit 4 without its back resting portion results in shifting cantilever-like connection 75 in a forward direction, see Fig. 14 defining the distance between pivot 74 and cantilever-like connection 75 by numeral 76. Loading of longitudinally extensible seating portion 16 and longitudinally non-extensible back resting portion 17 by a person properly seated on the seat spring construction is shown in Fig. 15, disclosing that part of the load is carried by longitudinally non-extensible back resting portion 17, resulting in flattening out of seating portion 16 with the effect of shifting cantilever-like connection 75 toward pivot 74 as indicated by distance 77 which is smaller than distance 76.

Seat spring constructions of the type described, when loaded in normal seating position, effect a shifting of the cantilever-like connection 75 in a forward direction, and when loaded in reclined position, effect a shifting of the cantilever-like connection 75 in a rearward direction, as best seen in Figs. 16 and 17. Thus, Fig. 16 shows a reclined, unloaded seat spring construction and Fig. 17 a reclined, fully loaded seat spring construction. Cantilever-like connection 75 has been shifted in a backward direction, the distance 78 between pivot 74 and cantilever-like connection 75 in Fig. 16 being smaller than distance 79 between pivot 74 and cantilever-like connection 75 in Fig. 17. Fig. 18 discloses the seat spring construction in unloaded condition, with back resting portion 17 folded upon seating portion 16. The back resting portion is curved at its lower end portion 80, as indicated in Figures 13 through 18, for cooperation with seating portion 16 to effect yielding contact of portion 80 with the hollow of an occupant's back. It is of particular importance to note that the reference pivot point 74, which represents the point of frame pivoting for folding and reclining movements of the seating construction, axially coincides with the combined pivot and cantilever-like connection 75. It is necessary to provide this coincident location of pivot 74 and connection 75 in the unloaded normal seating position of Fig. 13 so that the axes defined thereby will remain in immediately adjacent relation when the construction is subjected to the folding and reclining action of Figs. 16 and 18 to avoid distortion of the suspended structure relative to its supporting frame means.

The floating action of cantilever-like connection 75 varies with seating and load conditions and effects shape and form of back resting portion 17, as shown in Figs. 19 through 32. Fig. 19 diagrammatically discloses in full and dotted lines the shape of the seat spring construction in unloaded, normal and fully loaded condition with respect to straight reference plane $z$—$z$, a shape which is more clearly disclosed in the cross sections of Figs. 20 through 25 by the relative positions of the back resting portions with respect to plane $z$—$z$.

Fig. 26 discloses in full and dotted lines the shape of the seat spring construction when reclined in unloaded and fully loaded conditions, respectively, in a manner similar to Fig. 19. The described seat spring construction and its diagrams of Figures 27 through 32 for unloaded, fully loaded, normal and inclined positions provide a hugging seating and resting spring foundation which can readily be upholstered by limited amounts of upholstery material without effecting seating and resting comfort of the finished upholstered seat spring structure.

In summary, the principles and features of the present invention are characterized by "suspended" wire springs which respond to the weight loading by stretching and conforming toward or hugging against the load shape. This suspended, stretch condition of the wire springs is achieved and controlled by the structural features of: a longitudinally extensible, generally horizontal seating portion of a longitudinally non-extensible, generally vertical back resting portion; a yieldable, cantilever-like connection of the forward end of the seating portion to a fixed supporting means; an upwardly extended curved sweep of the rear end of the seating portion; a merging of the seating portion sweep with the lower end of the back resting portion; and, for folding seat applications, a combined cantilever-like and pivotal connection between the seating and back resting portions. The wire forming the seating portion is of zig-zag shape to provide substantial longitudinal extensibility, whereas the wire forming the back portion is relatively straight, non-extensible, and of greater flexibility relative to the seating portion.

Wire spring units 4 of seat spring constructions 2 and 51 deviate from wire spring units described in my copending application Serial No. 703,066, filed December 16, 1957, in the attachment of the back resting portions to the supporting frame, the back resting portions 17 in the present application being linked to the frame 3 and in the copending application directly attached to the frame. This difference changes the behavior of the wire spring units in the seat spring constructions, that is, the load reaction of the seating portions and back resting portions, the seat spring constructions achieving an improved cushioning effect in performing the hugging action on an occupant's body, which is due to the pivot area formed in the back rest of the seat construction by the link suspension of the spring units.

Links 33, as previously described and shown (Figs. 6, 6a, 7 and 8), are attached to upper rail 6 of frame 3 in a pretensioned pivotal, a pivotal, or a cantilever-like fashion, and, furthermore, support edge wire member 44. In addition, links 33 provide upholstered seat spring constructions with trim tension and contribute to appearance and life of thus constructed upholstery structures.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

I claim:
1. In a seat spring construction, the combination of a frame embodying laterally and vertically off-set top and bottom rails hinged to each other and L-shaped wire spring units supported by said frame and suspended therefrom, each wire spring unit including a longitudinally elongated, flexible and generally horizontal seat portion and a longitudinally elongated, flexible, generally vertical back rest portion connected to said seat portion, said back rest portion being connected to the seat portion in cantilever-like fashion when tilted in a direction away from the seat portion and in hinge-like fashion when tilted in a direction toward the seat portion, and link means connected to said back rest portion and secured to the top rail for suspending the back rest portion therefrom.

2. In a seat spring construction, the combination of vertically spaced, laterally offset, lower and upper supporting means and a wire spring including a longitudinally extensible, generally horizontal seat portion and a longitudinally non-extensible, generally vertical back rest portion, said seat and back rest portions being overlapped, merged and interconnected with each other, said seat portion having its front end supported in elevated, forwardly extended position on the lower supporting means and link means connected to said back rest portion and secured to the upper supporting means for suspending the back rest portion therefrom.

3. In a seat spring construction, the combination of vertically spaced, laterally offset, lower and upper supporting means and a wire spring including a longitudinally extensible, generally horizontal seat portion and a longitudinally non-extensible, generally vertical back rest portion, said seat and back rest portions being overlapped, merged and interconnected with each other, said seat portion having its front end supported in elevated, forwardly extended position on the lower supporting means, and V-shaped link means having its apex hinged to the top end of the back rest portion and one of its angularly related arms connected to the upper supporting means to suspend the wire spring therefrom.

4. In a seat spring construction, the combination of vertically spaced, laterally offset, lower and upper supporting means and a wire spring including a longitudinally extensible, generally horizontal seat portion and a longitudinally non-extensible, generally vertical back rest portion, said seat and back rest portions being overlapped, merged and interconnected with each other, said seat portion having its front end supported in elevated, forwardly extended position on the lower supporting means, V-shaped link means having angularly related arms, said V-shaped link means having its apex hinged to the top of the back rest portion and one arm suspended from the upper supporting means, and an edge wire connected to the other arm of the V-shaped link means to extend the edge wire forwardly of the upper supporting means.

5. In a seat spring construction, the combination of a frame embodying laterally and vertically off-set top and bottom rails hinged to each other and L-shaped wire spring units supported by said frame and suspended therefrom, each wire spring unit including a longitudinally elongated, flexible and generally horizontal seat portion and a longitudinally elongated, flexible, generally vertical back rest portion connected to said seat portion, said back rest portion being connected to the seat portion in cantilever-like fashion when tilted in a direction away from the seat portion and in hinge-like fashion when tilted in a direction toward the seat portion, said seat portions having their front end yieldingly supported on the bottom rail forwardly and upwardly with respect thereto, and a continuous link member of substantial zigzag shape hinged with its one side edge to the tops of a plurality of back rest portions and secured with its other side edge to the top rail for suspending the said back rest portions from the top rail.

References Cited in the file of this patent

UNITED STATES PATENTS

| | | |
|---|---|---|
| 2,532,884 | Benson | Dec. 5, 1950 |
| 2,669,293 | Neely et al. | Feb. 16, 1954 |

FOREIGN PATENTS

| | | |
|---|---|---|
| 635,466 | Great Britain | Apr. 12, 1950 |
| 645,113 | Great Britain | Oct. 25, 1950 |